US010702802B1

(12) United States Patent
Weber

(10) Patent No.: US 10,702,802 B1
(45) Date of Patent: Jul. 7, 2020

(54) SYSTEMS, METHODS, AND APPARATUS FOR SEPARATING FLUID MIXTURES

(71) Applicant: Wildcat Fluids LLC, Mathis, TX (US)

(72) Inventor: Jeffery P. Weber, Mathis, TX (US)

(73) Assignee: Wildcat Fluids LLC, Mathis, TX (US)

( * ) Notice: Subject to any disclaimer, the term of this patent is extended or adjusted under 35 U.S.C. 154(b) by 0 days.

(21) Appl. No.: 16/427,858

(22) Filed: May 31, 2019

Related U.S. Application Data

(60) Provisional application No. 62/822,375, filed on Mar. 22, 2019.

(51) Int. Cl.
*B01D 21/24* (2006.01)
*B01D 21/02* (2006.01)
*E21B 43/34* (2006.01)
*B01D 21/30* (2006.01)
*B01D 19/00* (2006.01)

(52) U.S. Cl.
CPC ......... *B01D 21/02* (2013.01); *B01D 19/0042* (2013.01); *B01D 19/0068* (2013.01); *B01D 21/245* (2013.01); *B01D 21/2416* (2013.01); *B01D 21/2444* (2013.01); *B01D 21/2494* (2013.01); *B01D 21/302* (2013.01); *E21B 43/34* (2013.01)

(58) Field of Classification Search
CPC ............ B01D 19/0042; B01D 19/0068; B01D 21/2416; B01D 21/2444; B01D 21/245; B01D 21/2494; B01D 21/302; E21B 43/34
USPC ....... 210/801, 803, 519, 533, 537, 539, 540; 95/253; 96/182, 183; 166/267, 75.12
See application file for complete search history.

(56) References Cited

U.S. PATENT DOCUMENTS

| | | | | |
|---|---|---|---|---|
| 3,814,262 A | * | 6/1974 | Nolley, Jr. | ......... B01D 17/0208 210/519 |
| 3,849,310 A | * | 11/1974 | Condolios | ............ B01D 21/245 210/534 |
| 5,415,776 A | * | 5/1995 | Homan | ............... B01D 17/0208 210/519 |
| 5,837,152 A | * | 11/1998 | Komistek | .......... B01D 17/0208 210/801 |
| 6,214,092 B1 | | 4/2001 | Odom | |
| 6,375,718 B1 | * | 4/2002 | Blangetti | ........... B01D 19/0042 95/244 |
| 6,506,310 B2 | | 1/2003 | Kulbeth | |
| 6,808,626 B2 | | 10/2004 | Kulbeth | |
| 7,198,659 B1 | | 4/2007 | Fanguy | |
| 7,364,661 B2 | * | 4/2008 | Puik | ................... B01D 17/0208 210/533 |
| 7,514,011 B2 | | 4/2009 | Kulbeth | |
| 8,152,911 B1 | | 4/2012 | Williams et al. | |
| 8,158,000 B2 | | 4/2012 | Newman | |
| 8,449,779 B2 | | 5/2013 | Thompson | |
| 8,517,167 B2 | | 8/2013 | Thompson | |

(Continued)

OTHER PUBLICATIONS

Rain for Rent, Steel Tank Diffuser Tank, advertisement flyer, https://www.rainforrent.com/equipment/diffuser-tank/.

*Primary Examiner* — Christopher Upton
(74) *Attorney, Agent, or Firm* — Victor H. Segura

(57) ABSTRACT

Techniques and apparatus for separating a Flowback mixture received from a wellbore. Employing a vessel or system of vessels to receive the fluid mixture and configured to manage the discharge of gases, liquids, and solids to maintain a vapor barrier in the vessel(s) to prevent unwanted release of gas to the atmosphere.

20 Claims, 4 Drawing Sheets

(56) References Cited

U.S. PATENT DOCUMENTS

| | | | |
|---|---|---|---|
| 8,623,221 B1 * | 1/2014 | Boyd | B01D 21/2494 |
| | | | 210/539 |
| 9,597,614 B2 | 3/2017 | Thompson | |
| 9,687,761 B2 | 6/2017 | Thompson | |
| 2004/0129633 A1 * | 7/2004 | Edmondson | E21B 43/34 |
| | | | 210/539 |
| 2005/0016937 A1 * | 1/2005 | Smullin | B01D 21/2494 |
| | | | 210/540 |
| 2017/0252674 A1 | 9/2017 | Thompson | |

* cited by examiner

COLLECT FLUID MIXTURE FROM A WELLBORE WITHIN A SEALED VESSEL HAVING A CHAMBER, THE VESSEL INCLUDING:

AT LEAST ONE INLET CONDUIT PROXIMATE A MIDDLE SECTION OF THE VESSEL TO ADMIT THE FLUID MIXTURE INTO THE VESSEL;

A LIQUIDS DISCHARGE LINE, COMPRISING:
A STANDPIPE DISPOSED WITHIN THE VESSEL, THE STANDPIPE HAVING AN OPENING AT AN UPPER END TO RECEIVE AND TRANSPORT LIQUIDS FROM WITHIN THE VESSEL TO A DISCHARGE PORT PROXIMATE A LOWER SECTION OF THE VESSEL;
A LIQUIDS DISCHARGE PIPE EXITING THE VESSEL AT THE DISCHARGE PORT AND HAVING A CURVED SECTION, WHEREIN THE STANDPIPE AND LIQUIDS DISCHARGE PIPE FORM A P TRAP;

A VACUUM BREAKER VALVE MOUNTED ON THE FLUID DISCHARGE PIPE;

A GAS DISCHARGE CONDUIT COUPLED TO A GAS DISCHARGE PORT PROXIMATE AN UPPER SECTION OF THE VESSEL;

A SOLIDS DISCHARGE PORT AT THE BOTTOM OF THE VESSEL

*100*

DISCHARGE GAS WITHIN THE VESSEL OUT THE GAS DISCHARGE CONDUIT

*105*

DISCHARGE LIQUIDS WITHIN THE VESSEL OUT THE LIQUIDS DISCHARGE LINE

*110*

OPERATE A VALVE COUPLED TO THE SOLIDS DISCHARGE PORT TO PERMIT DISCHARGE OF SOLIDS FROM WITHIN THE VESSEL

SYSTEMS, METHODS, AND APPARATUS FOR SEPARATING FLUID MIXTURES

CROSS-REFERENCE TO RELATED APPLICATIONS

This application claims priority to U.S. Provisional Patent Application No. 62/822,375, filed on Mar. 22, 2019, titled "Systems, Methods, and Apparatus for Separating Fluid Mixtures." The entire disclosure of Application No. 62/822,375 is hereby incorporated herein by reference.

Not applicable.

STATEMENT REGARDING FEDERALLY SPONSORED RESEARCH

Not applicable.

TECHNICAL FIELD OF THE INVENTION

This disclosure relates generally to techniques for collecting and handling fluid mixtures, and more particularly to vessels or tanks for separating fluid mixtures received from subsurface wellbores.

BACKGROUND

In the oilfield industry, the completion of subsurface wells to produce hydrocarbons entails the insertion of casing tubulars into a wellbore traversing the subsurface formations. Specialized tools are then inserted into the casing to perforate the walls of the tubular at desired subsurface locations in order to allow the hydrocarbons in the surrounding formation to flow into the casing for collection at the surface. Once the casing is perforated, a well stimulation technique known as hydraulic fracturing is applied to create cracks in the rock formations surrounding the wellbore to create fissures or fractures through which natural gas, petroleum, and other fluids can flow more freely. In this process, a fluid is injected into the casing at high pressure to penetrate the formation via the perforations in the casing. Fracturing of a particular stage along the casing requires isolation of casing sections. In this way, the hydraulic fracture is created at the location of the perforations. In such operations, a "plug" is set in the casing to seal off the casing section to receive the high-pressure fluid. Once the fracture is initiated, a propping agent, such as sand, is added to the fluid injected into the wellbore.

After all the stages along the casing have been fractured, the series of plugs are removed so that the well can be produced via the perforations from all the stages. It is common during this drill out process to utilize a coil tubing unit or work over rig to remove the plugs placed in the well during the fracturing process. A shortcoming of plugs that are drilled out is that they leave debris in the wellbore. This debris can create problems with subsequent operations in the well, or at the surface, should it be produced. As oil and gas begin to flow into the wellbore, unwanted fluids and gasses, as well as unwanted particulates from the strata (including, sand, salts, etc.), combine with the plug debris forming a fluid mixture in the wellbore.

The fluid mixture is brought to the surface through a hydraulic process and the fluid is separated into hydrocarbon and water streams and the water is recirculated as part of the drill out process. The combined stream of Gas/Liquid Hydrocarbon/Solids/Water are generally referred to as "Flowback." Simple frac tanks are commonly used to collect the unwanted Flowback from the wellbore. When the frac tank is full of collected fluids, sand, salts, gasses, etc., different techniques are used to process its contents. The collection, removal, and decontamination of the Flowback is an expensive process. In some cases, environmentally approved services are employed to remove the Flowback collected in the tank.

Thus, a need remains for improved techniques for separating and reclaiming Flowback arriving at the surface from a wellbore.

SUMMARY

According to an aspect of the invention, an apparatus for separating a fluid mixture includes a sealed vessel having a chamber to collect a fluid mixture received from a wellbore, the vessel including: at least one inlet conduit proximate a middle section of the vessel to admit the fluid mixture into the vessel; a liquids discharge line, including: a standpipe disposed within the vessel, the standpipe having an opening at an upper end to receive and transport liquids from within the vessel to a discharge port proximate a lower section of the vessel; a liquids discharge pipe exiting the vessel at the discharge port and having a curved section, wherein the standpipe and liquids discharge pipe form a P trap; and a vacuum breaker valve mounted on the liquids discharge pipe. The vessel also including a gas discharge conduit coupled to a gas discharge port proximate an upper section of the vessel; and a valve coupled to a solids discharge port, the valve configured to permit discharge of solids from within the vessel.

According to another aspect of the invention, a method for separating a fluid mixture includes collecting a fluid mixture from a wellbore within a sealed vessel having a chamber, the vessel including: at least one inlet conduit proximate a middle section of the vessel to admit the fluid mixture into the vessel; a liquids discharge line, including: a standpipe disposed within the vessel, the standpipe having an opening at an upper end to receive and transport liquids from within the vessel to a discharge port proximate a lower section of the vessel; a liquids discharge pipe exiting the vessel at the discharge port and having a curved section, wherein the standpipe and liquids discharge pipe form a P trap; and a vacuum breaker valve mounted on the fluid discharge pipe; a gas discharge conduit coupled to a gas discharge port proximate an upper section of the vessel; and a solids discharge port at the bottom of the vessel. The method also including discharging gas within the vessel out the gas discharge conduit; discharging liquids within the vessel out the liquids discharge line; and operating a valve coupled to the solids discharge port to permit discharge of solids from within the vessel.

According to another aspect of the invention, a system for separating a fluid mixture includes a plurality of vessels to collect a fluid mixture received from a wellbore. Each vessel including: at least one inlet conduit proximate a middle section of the vessel to admit the fluid mixture into the vessel; a liquids discharge line, comprising: a standpipe disposed within the vessel, the standpipe having an opening at an upper end to receive and transport liquids from within the vessel to a discharge port proximate a lower section of the vessel; a liquids discharge pipe exiting the vessel at the discharge port and having a curved section, wherein the standpipe and liquids discharge pipe form a P trap; and a vacuum breaker valve mounted on the liquids discharge pipe. Each vessel also includes a valve coupled to a solids discharge port, the valve configured to permit discharge of solids from within the vessel; and a gas discharge port proximate an upper section of the vessel. The system also includes: a gas discharge conduit coupled to the gas discharge port of each vessel; and a valve mechanism to selectively isolate fluid mixture flow into one or more of the vessels.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIG. 7, in accordance with some embodiments of the present disclosure, is a flow chart illustrating a process for separating a fluid mixture.

DETAILED DESCRIPTION

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are described in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

Once the Flowback arrives at the surface it presents a four-phase fluid mixture that requires separation into distinct streams: Gas/Liquid Hydrocarbon/Solids/Water. An effective way to separate these streams is to first address the removal of the gas phase from the other three phases. At this point in the development of the well, the quantity of the gas phase is very small, but still requires special handling. The gas should enter a sealed vessel for separation and not find release to the atmosphere. Embodiments of this disclosure perform the action of separating the gas phase prior to releasing the other three phases for additional processing.

Figure 1:
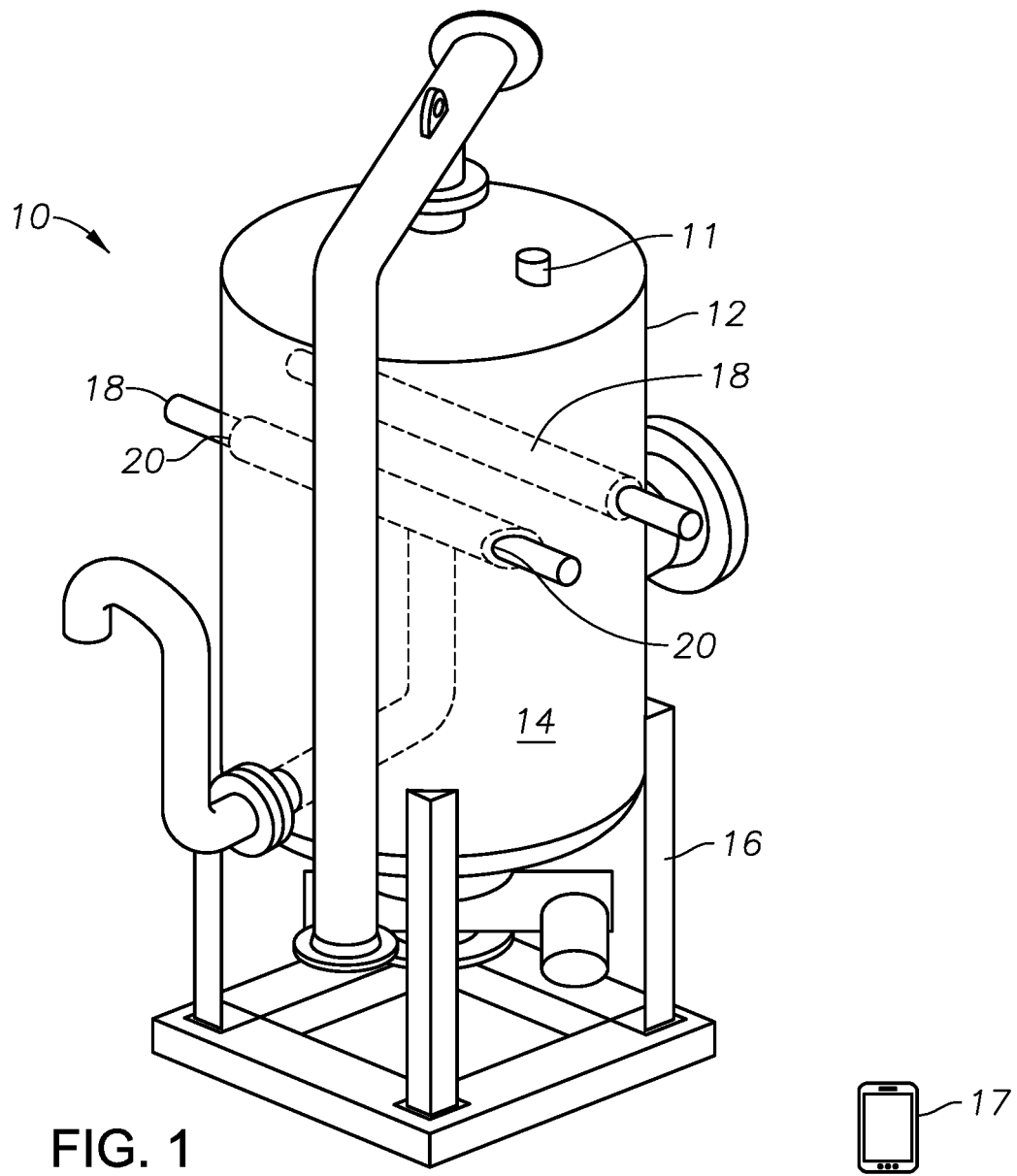
FIG. 1, in accordance with some embodiments of the present disclosure, depicts a schematic of a vessel apparatus configured to separate a fluid mixture.

FIG. 1 depicts an embodiment of this disclosure. An apparatus 10 for separating the Flowback from the wellbore consists of a sealed vessel 12. The vessel 12 has a single inner chamber 14 to collect the fluid mixture received from a wellbore (not shown). It will be appreciated by those skilled in the art that the vessel 12 may be manufactured via conventional tank manufacturing processes. It will also be appreciated that the vessel 12 may be produced from suitable materials depending on the specific application and fluid mixtures to be collected and processed by the vessel 12. For example, the vessel 12 may be produced using metals (e.g. stainless steel, alloys, etc.), non-metallic materials (e.g. PVC, carbon fiber composites, etc.), or a combination of metallic and non-metallic materials. Although a cylindrical vessel 12 is depicted in FIG. 1, other embodiments may be produced with vessels 12 having different shapes (e.g. oblong, spherical, square, rectangular, etc.). The dimensions of the vessel 12 may also vary in height, width, and internal chamber 14 volume depending on the desired application. Some embodiments may be implemented with a conventional digital level readout 11 mounted at the top of the vessel 12.

In FIG. 1 the vessel 12 is depicted supported by a frame 16. In one embodiment the frame 16 is configured with a square base and four support legs extending from the base to engage with the lower outer section of the vessel 12. The frame 16 may be produced using any suitable materials that will support the weight of the vessel 12 and its contents when the vessel is in operation. The vessel 12 may be permanently coupled to the frame 16 using conventional means (e.g. welding, fasteners, etc.) or temporarily disposed on the frame, depending on the desired application. For example, if the vessel 12 is to be used as a stand-alone unit, the frame 16 provides a suitable means to set the vessel in place. In some applications, the frame 16 provides a convenient stand to set the vessel 12 atop a discharge receiving tank. Other applications of the vessel 12 embodiments may be set or carried on trailers, vehicles, or linked with other vessels, as desired for the particular use and environment of operation.

Flowback fluid mixture from the wellbore is admitted into the vessel 12 chamber 14 by one or more inlet conduits 18 mounted proximate a middle section of the vessel. Each inlet conduit 18 is passed through the vessel 12, entering one side of the vessel and exiting at another side of the vessel via apertures 20 formed in the vessel walls. Similar to the vessel 12, the inlet conduit(s) 18 may be made from any suitable materials depending on the specific application and fluid mixtures to be collected and processed by the vessel. The inlet conduit 18 dimensions (inside diameter and outside diameter) may vary depending on the desired application. To maintain a sealed chamber 14, the pass-through junctions of the inlet conduit 18 and apertures 20 may be sealed using suitable conventional means as known in the art (e.g. gaskets, O-rings, sealing compounds, etc.).

The Flowback mixture to be treated in the vessel 12 is transported to the inlet conduit(s) 18 from the wellbore via conventional fluid transport systems used in oilfield operations (not shown). Such fluid transport systems include means to connect to one or both open ends of the inlet conduit(s) 18 extending out from the vessel 12 wall at the apertures 20. If only one open end of an inlet conduit 18 is coupled to the wellbore fluid transport system, the other end of the conduit may be capped to close it off.

Figure 2:
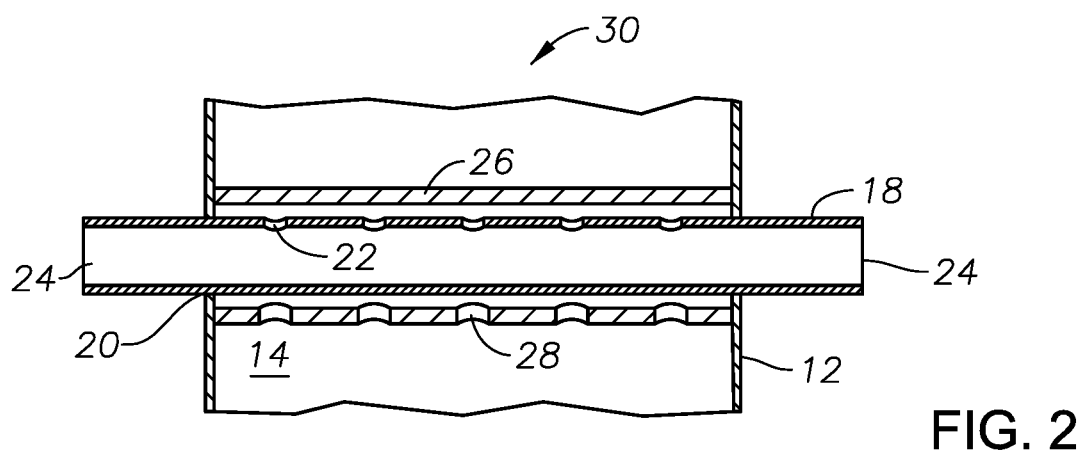
FIG. 2, in accordance with some embodiments of the present disclosure, depicts a cutaway side view of a fluid mixture inlet baffle.

FIG. 2 depicts a cutaway cross-section of an inlet conduit 18 embodiment mounted within a vessel 12. The conduit 18 is configured with a plurality of apertures 22 spaced along the conduit body. As Flowback fluid mixture is received at one or both open ends 24 of the inlet conduit 18, the mixture is dispersed throughout the vessel 12 chamber 14 via the apertures 22. FIG. 2 also depicts the inlet conduit 18 passing through a tubular sleeve 26 disposed inside the vessel 12. The tubular sleeve 26 may be made from any suitable materials depending on the specific application and fluid mixtures to be collected and processed by the vessel 12. The tubular sleeve is also configured with a plurality of apertures 28 spaced along the sleeve body to disperse the fluid mixture throughout the vessel 12 chamber 14. The inside diameter of the sleeve 26 is greater than the outside diameter of the inlet conduit 18, allowing the inlet fluid mixture to flow through the annulus between the two concentric tubes and out the sleeve apertures and into the vessel 12. In some embodiments, the inlet conduit 18 and the tubular sleeve 26 have the same number of apertures 22, 28 formed thereon such that the apertures of both tubes align with one another along the length of tube bodies. In this manner, the concentric tubes form a baffle 30 for the fluid mixture stream entering the vessel 12. Vessel 12 embodiments may be implemented with a single baffle 30 or multiple baffles mounted on the vessel to admit and disperse the fluid mixture into the vessel. Other embodiments may also be implemented with multiple baffles 30 mounted at different heights on the vessel 12 body. It will be appreciated by those skilled in the art that the tubular sleeve 26 may be positioned within the vessel 12 for passage of the inlet conduit 18 therethrough during assembly of the vessel.

Figure 3:
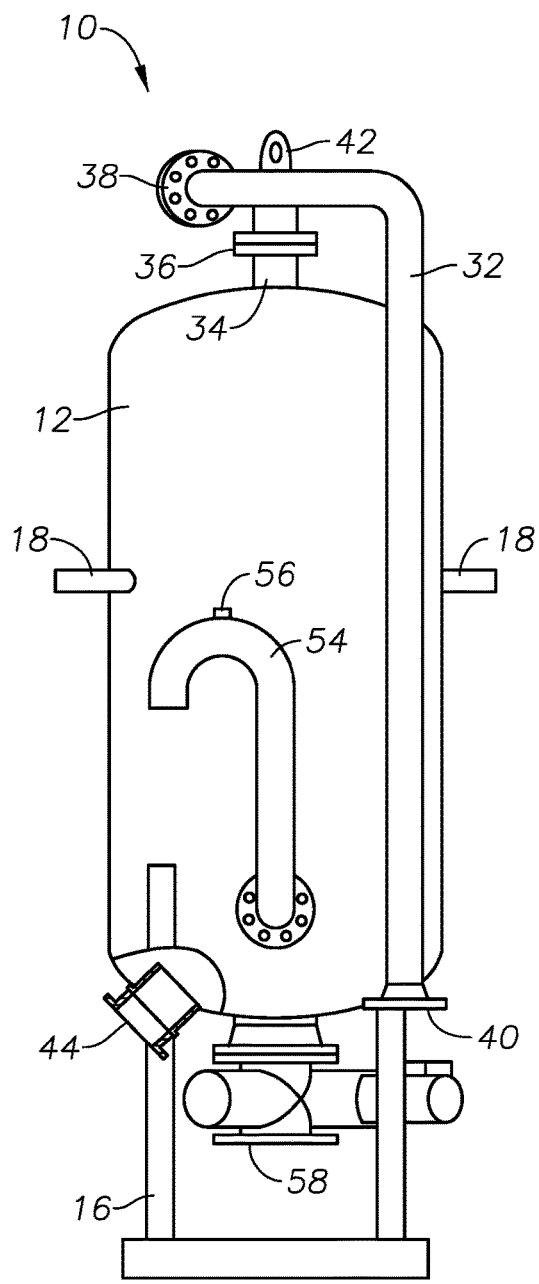
FIG. 3, in accordance with some embodiments of the present disclosure, depicts a schematic of a vessel apparatus configured to separate a fluid mixture.

The gas in the incoming Flowback stream rapidly separates from the solids and liquids streams due to a differential in density. Turning to FIG. 3, a side view of the apparatus 10 for separating the Flowback from the wellbore is depicted. A gas discharge conduit 32 is coupled to a gas discharge port 34 proximate an upper section of the vessel 12 via a bolted flange 36. Gas in the vessel 12 exits through the discharge port 34 and flows along the conduit 32. The gas discharge conduit 32 extends along the exterior wall of the vessel 12 and is configured with a first discharge port 38 proximate an upper end of the vessel and a second discharge port 40 proximate a lower end of the vessel. Depending on the application and types of gases involved, the first and/or second discharge ports 38, 40 may be linked to vent the gas to a flare stack for burn off or to vent the gas safely to the atmosphere. The gas discharge conduit 32 may be made from any suitable materials depending on the specific application and gases to be discharged by the vessel. In some embodiments, an upper section of the gas discharge conduit 32 is configured with a lifting eye 42 to facilitate lifting and movement of the apparatus 10. In other embodiments, the vessel 12 may be configured with a blind hatch 44 proximate a lower section of the vessel. The blind hatch 44 provides redundancy to permit manual disposal of liquids and solids from within the vessel 12 if desired. In other embodiments the vessel 12 may be configured with an inspection hatch 45 proximate a middle section of the vessel (See FIG. 4).

Figure 4:
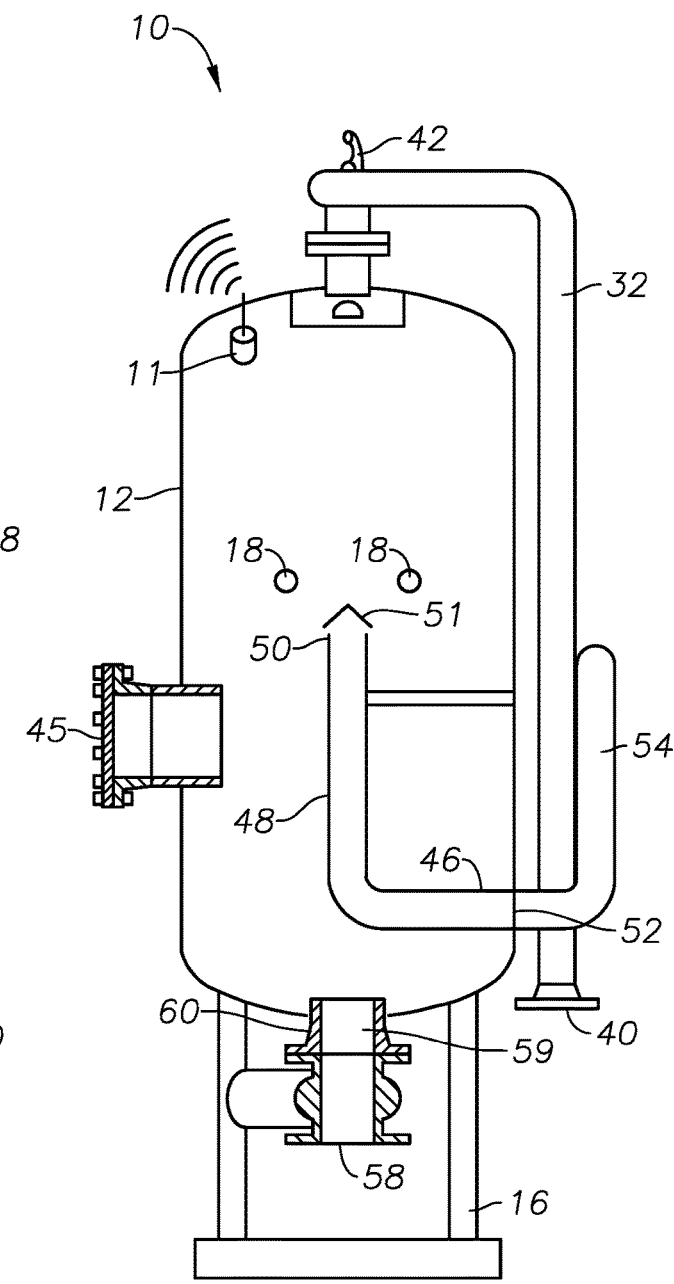
FIG. 4, in accordance with some embodiments of the present disclosure, depicts another schematic of a vessel apparatus configured to separate a fluid mixture.

Except for gas discharge via the gas discharge conduit 32, the vessel 12 is otherwise sealed from the atmosphere due to vapor barriers at fluids and solids exit points. The presence of discharge ports on the vessel 12 for liquids and solids creates specific problems in the management of a vapor barrier. If not managed properly, the gas will escape through the discharge ports and release potentially harmful substances to the atmosphere and in the presence of personnel. The apparatus 10 is configured to address the potential problems. FIG. 4 depicts the apparatus 10 configured with a liquids discharge line 46. The discharge line 46 includes a vertical standpipe 48 disposed within the vessel 12. The standpipe 48 has an opening 50 at an upper end to receive and transport liquids from within the vessel 12 to a discharge port 52 (See FIG. 4) proximate a lower section of the vessel. The standpipe 48 is coupled to a liquids discharge pipe 54 exiting the vessel 12 at the discharge port 52. The liquids discharge pipe 54 is configured with a curved section (See FIG. 3). The standpipe 48 and the liquids discharge pipe 54 configuration forms a P trap as known in the art. The liquids discharge line 46 may be formed from any suitable materials depending on the specific application and fluid mixtures to be collected and processed by the vessel 12.

The curved liquids discharge pipe 54 exiting the vessel 12 is equipped with a vacuum breaker valve 56 (See FIG. 3). In the event the liquids discharge line 46 is completely charged with fluids and potentially empties all fluids to the top level of the standpipe 48, the breaker valve 56 equalizes the pressure with the atmosphere and prevents the line from creating a siphon within the vessel 12. A conventional vacuum breaker valve 56 may be used. For example, vacuum breaker valves available from Kadant Inc. (https://kadant.com) may be used in implementations of the disclosed embodiments.

Figure 5:
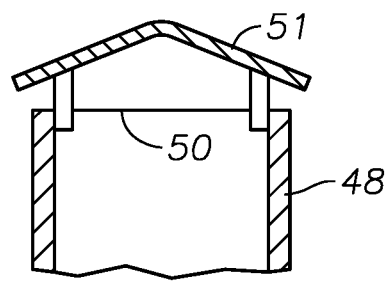
FIG. 5, in accordance with some embodiments of the present disclosure, depicts a cutaway side view of pipe cover.

As the incoming Flowback mixture is dispersed into the vessel 12 from the baffle(s) 30, solids in the mixture may fall directly into the opening 50 at the upper end of the standpipe 48, clogging the pipe. FIG. 5 depicts a cone-shaped cover 51 mounted at the standpipe opening 50 to shield and prevent solids from 48 falling into the opening while permitting fluids to flow into the opening.

The solids that arrive in the Flowback mixture accumulate in the bottom of the vessel 12 and require discharge into another vessel (not shown). The solids and liquids from the Flowback tend to aggregate at the bottom of the vessel 12 with the liquids occupying a layer on top of the solids. This presence of the liquids creates the vapor barrier and needs to be maintained. This requires management of the rate at which the solids are discharged in order to preserve the vapor barrier above the solids and prevent the release of gas to the atmosphere. An electric rotary valve 58 is coupled to a solids discharge port 60 on the bottom of the vessel 12. The rotary valve 58 is operated to manage the solids discharge from the vessel 12. The rotary valve 58 is configured with a rotor entailing a series of paddles to remove solids at a determined rate and prevent fluids from escaping through the solids discharge port 60. Each revolution of the rotary valve 58 removes a specific quantity of solids from within the vessel 12 and discharges them into a receiving tank (not shown). Operation of the rotary valve 58 delivers a consistent solids stream into the receiving tank and maintains the vapor barrier in the vessel 12. Conventional rotary valves 58 as known in the art may be used in implementations of the apparatus 10. For example, rotary valves available from ACS Valves (www.acsvalves.com) may be used in implementations of the disclosed embodiments. The combination of the anti-siphon breaker valve 56 to manage liquids discharge and the rotary valve 58 to manage solids/liquids discharge allow the regulation of the vessel 12 in a unique manner.

In some embodiments, the rotary valve 58 may be configured with conventional electronics and computer technology 59 including a processor and an antenna to provide for wired or wireless control and operation of the valve. Performance and operation of the rotary valve 58 may be monitored and controlled using a computing device 17 (See FIG. 1). In other embodiments, the digital level readout 11 mounted at the top of the vessel 12 may be configured with conventional electronics including a processor and an antenna to wirelessly transmit data representing the mixture level in the vessel to the computing device 17 (See FIG. 4). The computing device 17 may include, for example, a mobile phone, a tablet, a laptop computer, a desktop computer, an electronic notepad, a server computing device, etc. In some implementations, the rotary valve 58 and computing device 17 can be implemented for remote valve monitoring and control via a cloud-computing architecture. In yet other embodiments, the computing device 17 may be programmed to automatically control the valve 58 to adjust the volume of solids discharge from the vessel 12 depending on the mixture level data wirelessly received from the digital level readout 11. It will be appreciated by those skilled in the art that the processors in the digital level readout 11 and the rotary valve 58 may be configured to perform as described herein using conventional software using any suitable computer language and electronics protocols.

Figure 6:
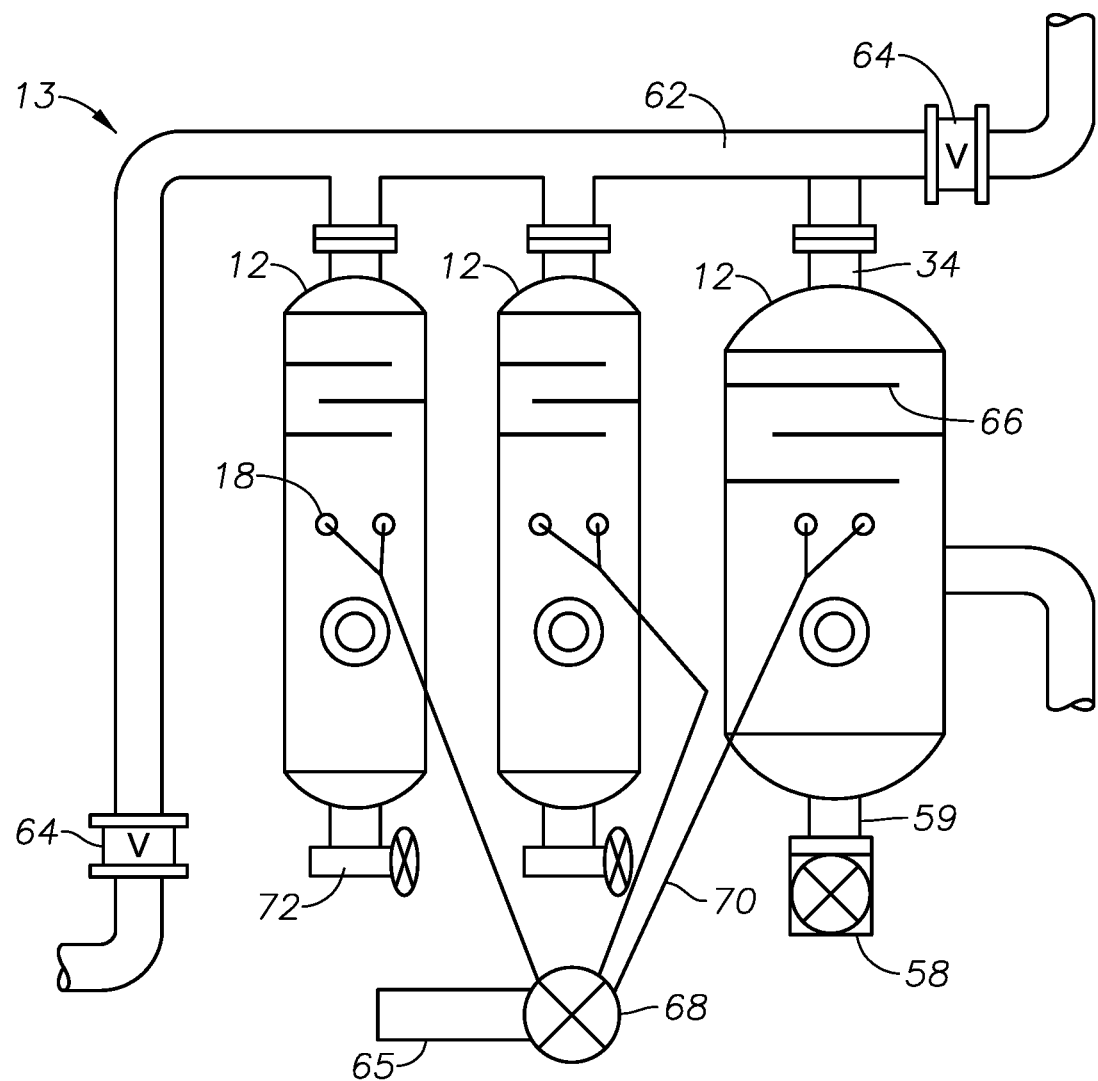
FIG. 6, in accordance with some embodiments of the present disclosure, depicts a system configured to separate a fluid mixture.

FIG. 6 depicts another embodiment of this disclosure. In this implementation, a series of vessels 12 are linked together to form a system 13 for separating fluid mixtures. The vessels 12 operate in a similar manner and are configured similarly to the other vessel embodiments 12 disclosed herein, with minor differences. A gas discharge conduit 62 is coupled to the gas discharge port 34 of each vessel. One end of the discharge conduit 62 may be configured to vent the gas safely to the atmosphere and the other end to vent the gas to a flare stack for burn off. The gas discharge conduit 62 includes valves 64 at each end of the conduit 62, with the vessels 12 linked into the conduit in between the valves. In this manner, either valve 64 may be closed to shut off gas flow through either or both ends of the conduit 62. The valves 64 may be conventional valves configured for manual operation or with electronics for automatic or remotely controlled operation.

The system 13 of FIG. 6 offers the ability to process large volumes of Flowback mixtures, where the flow rate may exceed the capacity of a single vessel 12. Some vessel 12 embodiments (whether implemented as stand-alone units or in a multi-unit system), may be configured with internal plates 66 or extensions affixed to the inner walls at the upper end of the vessel, above the inlet conduit(s) 18 to provide baffling to prevent solid or liquid splash into the gas discharge conduit 32, 62. The multi-unit system 13 employs a valve mechanism 68 to selectively isolate fluid mixture flow into one or more of the vessels 12. The valve mechanism 68 may use conventional tubing 70 and one or more valves configured for manual operation or with electronics for automatic or remotely controlled operation. The Flowback mixture to be treated in the vessel(s) 12 is transported to a primary inlet 65 from the wellbore via conventional fluid transport systems used in oilfield operations. Embodiments may also be implemented with some vessels 12 configured with conventional hand-operated valves 72 and other vessels with mechanized rotary valves 58.

In accordance with some embodiments, FIG. 7 is a flow chart illustrating a process for separating a fluid mixture. At step 100, a fluid mixture from a wellbore is collected within a sealed vessel, the vessel including: at least one inlet conduit proximate a middle section of the vessel to admit the fluid mixture into the vessel; a liquids discharge line, comprising: a standpipe disposed within the vessel, the standpipe having an opening at an upper end to receive and transport liquids from within the vessel to a discharge port proximate a lower section of the vessel; a liquids discharge pipe exiting the vessel at the discharge port and having a curved section, wherein the standpipe and liquids discharge pipe form a P trap; and a vacuum breaker valve mounted on the fluid discharge pipe; a gas discharge conduit coupled to a gas discharge port proximate an upper section of the vessel; and a solids discharge port at the bottom of the vessel. At step 105, gas within the vessel is discharged out the gas discharge conduit. At step 110, liquids within the vessel are discharged out the liquids discharge line. At step 115, a valve coupled to the solids discharge port is operated to permit discharge of solids from within the vessel. This process may be implemented using the techniques and embodiments disclosed herein.

In light of the principles and example embodiments described and depicted herein, it will be recognized that the example embodiments can be modified in arrangement and detail without departing from such principles. Also, the foregoing discussion has focused on particular embodiments, but other configurations are also contemplated. Even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. The terms "including" and "comprising" are used in an open-ended fashion, and thus should be interpreted to mean "including, but not limited to . . . ." The term "processor" may refer to one or more processors.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. An apparatus for separating a fluid mixture, comprising:
  a sealed vessel having a chamber to collect a fluid mixture received from a wellbore, the vessel comprising:
    at least one inlet conduit proximate a middle section of the vessel to admit the fluid mixture into the vessel;
    a liquids discharge line, comprising:
      a standpipe disposed within the vessel, the standpipe having an opening to receive and transport liquids from within the vessel to a discharge port on the vessel;
      a liquids discharge pipe exiting the vessel at the discharge port and having a curved section, wherein the standpipe and liquids discharge pipe form a P trap; and
      a vacuum breaker valve mounted on the liquids discharge pipe;
    a gas discharge conduit coupled to a gas discharge port proximate an upper section of the vessel; and
    a valve coupled to a solids discharge port, the valve configured to permit discharge of solids from within the vessel.

2. The apparatus of claim 1, wherein the standpipe is configured to prevent solids from clogging the opening.

3. The apparatus of claim 1, wherein a section of each at least one inlet conduit extends into the vessel chamber and is configured with a plurality of apertures to permit disposal of the fluid mixture within the vessel.

4. The apparatus of claim 3, wherein the section of each at least one inlet conduit extending into the vessel chamber passes through a tubular sleeve inside the vessel, the sleeve having a plurality of apertures to permit passage of the fluid mixture into the vessel.

5. The apparatus of claim 1, wherein the valve comprises a rotor configured to remove the solids from within the vessel.

6. The apparatus of claim 1, wherein the gas discharge conduit extends along an exterior wall of the vessel and is configured with a first discharge port proximate an upper end of the vessel and a second discharge port proximate a lower end of the vessel.

7. The apparatus of claim 1, further comprising an inspection hatch proximate a middle section of the vessel.

8. The apparatus of claim 1, further comprising a hatch proximate a lower section of the vessel to permit disposal of the fluid mixture from within the vessel.

9. The apparatus of claim 1, wherein the vessel comprises a plurality of inlet conduits proximate a middle section of the vessel to admit the fluid mixture into the vessel.

10. The apparatus of claim 9, wherein a section of each of the plurality of inlet conduits extends into the vessel chamber and is configured with a plurality of apertures to permit disposal of the fluid mixture within the vessel.

11. The apparatus of claim 10, wherein the section of each of the plurality of inlet conduits extending into the vessel chamber passes through a tubular sleeve inside the vessel, the sleeve having a plurality of apertures to permit passage of the fluid mixture into the vessel.

12. The apparatus of claim 1, wherein the valve coupled to the solids discharge port is configured for monitoring or control via a computing system.

13. A method for separating a fluid mixture, comprising:
  collecting a fluid mixture from a wellbore within a sealed vessel having a chamber, the vessel including:
    at least one inlet conduit proximate a middle section of the vessel to admit the fluid mixture into the vessel;
    a liquids discharge line, comprising:
      a standpipe disposed within the vessel, the standpipe having an opening to receive and transport liquids from within the vessel to a discharge port on the vessel;
      a liquids discharge pipe exiting the vessel at the discharge port and having a curved section, wherein the standpipe and liquids discharge pipe form a P trap; and
      a vacuum breaker valve mounted on the fluid discharge pipe;
    a gas discharge conduit coupled to a gas discharge port proximate an upper section of the vessel; and
    a solids discharge port at the bottom of the vessel;
  discharging gas within the vessel out the gas discharge conduit;
  discharging liquids within the vessel out the liquids discharge line; and
  operating a valve coupled to the solids discharge port to permit discharge of solids from within the vessel.

14. The method of claim 13, wherein a section of each at least one inlet conduit extends into the vessel chamber and is configured with a plurality of apertures to permit disposal of the fluid mixture within the vessel.

15. The method of claim 14, wherein the section of each at least one inlet conduit extending into the vessel chamber passes through a tubular sleeve inside the vessel, the sleeve having a plurality of apertures to permit passage of the fluid mixture into the vessel.

16. The method of claim 13, wherein the valve comprises a rotor configured to remove the solids from within the vessel.

17. The method of claim 13, further comprising monitoring or controlling the valve coupled to the solids discharge port via a computing system.

18. The method of claim 13, comprising managing the discharging liquids and the discharging solids from within the vessel to maintain a vapor barrier in the vessel to prevent unwanted release of gas to the atmosphere.

19. A system for separating a fluid mixture, comprising:
  a plurality of vessels to collect a fluid mixture received from a wellbore;
    each vessel comprising:
      at least one inlet conduit proximate a middle section of the vessel to admit the fluid mixture into the vessel;
      a liquids discharge line, comprising:
        a standpipe disposed within the vessel, the standpipe having an opening to receive and transport liquids from within the vessel to a discharge port on the vessel;
        a liquids discharge pipe exiting the vessel at the discharge port and having a curved section, wherein the standpipe and liquids discharge pipe form a P trap;
        a vacuum breaker valve mounted on the liquids discharge pipe;
      a valve coupled to a solids discharge port, the valve configured to permit discharge of solids from within the vessel; and
      a gas discharge port proximate an upper section of the vessel;
  a gas discharge conduit coupled to the gas discharge port of each vessel; and
  a valve mechanism to selectively isolate fluid mixture flow into one or more of the vessels.

20. The system of claim 19, wherein the vessels are configured for control of fluid mixture flow into the vessels or solids discharge from the vessels via a computing system.

* * * * *